Dec. 15, 1964  R. C. BURGGREN  3,161,059
PRESSURE SENSING APPARATUS
Filed July 2, 1959
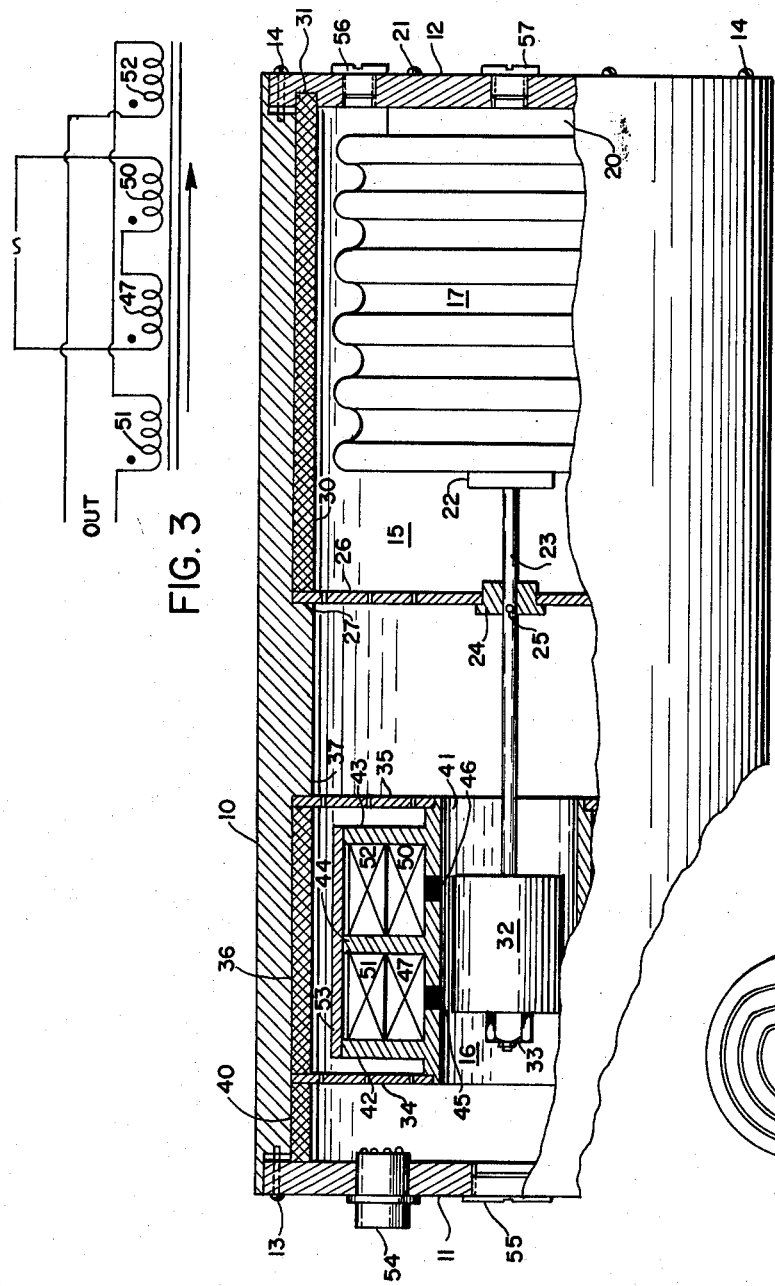
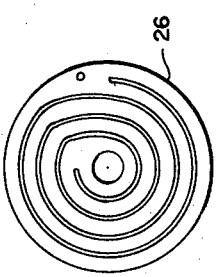
INVENTOR
ROBERT C. BURGGREN
BY
ATTORNEY

United States Patent Office 3,161,059
Patented Dec. 15, 1964

3,161,059
PRESSURE SENSING APPARATUS
Robert C. Burggren, North Oaks, Minn., assignor to Honeywell Inc., a corporation of Delaware
Filed July 2, 1959, Ser. No. 824,557
2 Claims. (Cl. 73—398)

This invention relates to the field of measurement and more particularly to the field of measuring a variable quantity by means which are subject to inaccuracies due to accelerations acting on the measuring instrument. A specific application of the invention is in the field of pressure measurement in aircraft, where instruments are subject to accelerations having components in all directions.

The principal object of the invention is to provide a measuring instrument in which the effect of any acceleration components is substantially eliminated.

A more specifically stated object of the invention is to provide a pressure sensor which is compensated for accelerations.

Various other objects, advantages and features of novelty not particularly enumerated above which characterize my invention are pointed out with particularity in the claims annexed hereto and forming a part thereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the drawing, FIGURE 1 is a partially sectional showing of an acceleration compensated pressure sensing device according to the invention, FIGURE 2 is an elevation of a disc spring as used in the device, and FIGURE 3 is a circuit diagram of an electromagnetic pickup as used in the device.

In the drawing element 10 is a generally cylindrical housing provided with end plates 11 and 12 fastened thereto as by screws 13 and 14. The housing encloses a sensing assembly 15 and an output assembly 16.

Sensing assembly 15 is shown to comprise a bellows 17 having a mounting plate 20 arranged for attachment to end plate 12 by suitable screws 21, and a second plate 22 carrying a rod 23 which projects in the direction of expansion and contraction of the bellows. A collar 24 is mounted on rod 23 by a cross pin 25, and carries a disc spring 26. The periphery of spring 26 is clamped between a shoulder 27 on housing 10 and a sleeve 30 carried in a groove 31 in end plate 12. An armature 32 is threadably mounted on rod 23, and may be locked in any adjusted position therealong by means of a suitable nut 33.

Output assembly 16 is shown to comprise a pair of disc springs 34 and 35 spaced by a suitable sleeve 36 and clamped against a second shoulder 37 on housing 10 by a further sleeve 40 cooperating with end plate 11. Carried between springs 34 and 35 is a bobbin 41 shown to comprise a pair of iron end pieces 42 and 43 and an iron central portion 44 separated by portions 45 and 46 of nonmagnetic material. All wound in the same direction on bobbin 41 are a pair of identical primary windings 47 and 50 and a pair of identical secondary windings 51 and 52. A shell 53 of magnetic material is provided for bobbin 41, and engages members 42, 43 and 44. Non-magnetic portion 45 is centered with respect to windings 47 and 51, and non-magnetic portion 46 is centered with respect to windings 50 and 52. With equal pressure inside and outside bellows 17, armature 32 is centered with respect to non-magnetic portions 45 and 46.

A multiple pin connector 54 is provided for making electrical connection to the ends of windings 42 and 43, and end plate 11 is bored with an aperture normally closed by a plug 55, which may be removed to permit adjustment of the position of armature 32 on rod 23.

Openings are also provided in end plate 12 for admission of one or more pressures to be measured to bellows 17 or the space surrounding it. These apertures are normally closed by plugs 56 and 57.

FIGURE 3 shows that primary windings 47 and 50 are energized from a suitable source of alternating voltage. Secondary windings 51 and 52 are connected in series opposition, so that when armature 32 is centered in bobbin 41, the equal voltages induced in windings 51 and 52 completely neutralize one another and no output is supplied from the series circuit. In normal operation armature 32 is moved in the direction of the axis of rod 23 by variations in pressure, changing the coupling between the primary windings and their respective secondary windings so that the secondary voltages are no longer equal, and a voltage output is supplied which varies in amplitude and reverses in phase with variation in the amount and reversal in the direction of the displacement of armature 32 from its normal position.

It must be appreciated that the end of bellows 17 remote from end plate 12, the disc spring 26, the rod 23, and the armature 32 comprise a mechanical assembly having a particular natural frequency and mass spring rate characteristic, and that when the instrument is subjected to accelerations having the direction of the axis of shaft 23, displacements of armature 32 may take place which are entirely independent of any changes of pressure acting on bellows 17. Bobbin 41, windings 47, 50, 51 and 52, shell 53, and springs 34 and 35 together comprise a second mechanical system having a natural frequency and mass spring rate characteristic, and I can make them equal to the natural frequency and mass spring rate characteristic of the elements including armature 32 by proper selection of dimensions. When this is accomplished, any movement of armature 32 caused by acceleration of the device is accompanied by an equal amount of movement of bobbin 41 in the same direction, and the electrical output supplied is therefore entirely independent of acceleration forces.

Numerous objects and advantages of my invention have been set forth in the foregoing description, together with details of the structure and function of my invention, and the novel features thereof are pointed out in the appended claims. The disclosure, however, is illustrative only, and I may make changes in detail especially in matters of shape, size, and arrangement of parts, within the principle of the invention, to the full extent indicated by the broad general meaning of the terms in which the appended claims are expressed.

I claim as my invention:

1. In combination: a bellows; means fixedly supporting said bellows at one end thereof; means supplying gas at different pressures to the inside and the outside of said bellows, so that the unsupported end thereof is physically displaced in accordance with the difference between said pressures; a rod extending from the unsupported end of said bellows in the direction of displacement thereof; means remote from said bellows resiliently supporting said rod for moving in said direction without appreciable movement having a component normal thereto; electrical pickoff means including a first portion carried by said rod for movement in said direction with respect to a second portion, the assembly of said bellows, said rod, the rod supporting means and said first portion of said pickoff means having a natural freqency in said direction; and means resiliently mounting said second portion of said pickoff means, in a position spaced from said bellows in said direction, for movement in said direction without appreciable movement having a component normal thereto, so that the natural frequency of said second portion in said direction is substantially the same as the natural frequency of said assembly.

2. In an altimeter having a pressure sensitive element which deflects in response to changes in atmospheric pressure, the combination comprising an armature coupled to said element to move in response to deflection of said element, a detector to define a null position and to generate a signal as said armature moves from said null position, and means for mounting said detector to prevent displacement of said armature from said null position under acceleration forces, said last named means comprising annular springs coupled to each end of said detector, the spring constant of said annular springs being dimensioned with respect to the mass of said detector in substantially the same ratio as the effective spring constant of said pressure sensitive element bears to the effective mass of said armature.

References Cited in the file of this patent

UNITED STATES PATENTS

| | | |
|---|---|---|
| 2,482,440 | Rylsky | Sept. 20, 1949 |
| 2,600,271 | Schaevitz | June 10, 1952 |
| 2,618,157 | Keeling | Nov. 18, 1952 |
| 2,715,680 | Tatel et al. | Aug. 16, 1955 |
| 2,752,498 | Ehret | June 26, 1956 |
| 2,932,807 | Bourns | Apr. 12, 1960 |